United States Patent
Kuvshinov et al.

(10) Patent No.: US 9,921,321 B2
(45) Date of Patent: Mar. 20, 2018

(54) SEISMIC ACQUISITION METHOD AND SYSTEM

(71) Applicant: SHELL OIL COMPANY, Houston, TX (US)

(72) Inventors: Boris Nikolaevich Kuvshinov, Rijiswijk (NL); Mikhail Garievich Danilouchkine, Rijswijk (NL); Robert Van Es, Rijswijk (NL); Theodericus Johannes Henricus Smit, Rijswijk (NL); Horng Jye Hwang, Rijswijk (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 14/914,443

(22) PCT Filed: Aug. 25, 2014

(86) PCT No.: PCT/EP2014/067967
§ 371 (c)(1),
(2) Date: Feb. 25, 2016

(87) PCT Pub. No.: WO2015/028411
PCT Pub. Date: Mar. 5, 2015

(65) Prior Publication Data
US 2016/0209529 A1    Jul. 21, 2016

(30) Foreign Application Priority Data

Aug. 27, 2013   (EP) ..................... 13181790

(51) Int. Cl.
*G01V 1/38* (2006.01)
*G01V 1/137* (2006.01)
*G01V 1/00* (2006.01)

(52) U.S. Cl.
CPC .............. *G01V 1/005* (2013.01); *G01V 1/137* (2013.01); *G01V 1/3808* (2013.01)

(58) Field of Classification Search
CPC ....... G01V 1/005; G01V 1/3808; G01V 1/137
(Continued)

(56) References Cited

U.S. PATENT DOCUMENTS

| 6,477,113 | B2 | 11/2002 | Hornbostel et al. |
| 6,906,981 | B2 | 6/2005 | Vaage |

(Continued)

FOREIGN PATENT DOCUMENTS

| CN | 102412848 | 4/2012 |
| CN | 102904581 | 1/2013 |

(Continued)

OTHER PUBLICATIONS

"Golomb ruler," Wikipedia, Aug. 25, 2012, downloaded Mar. 4, 2017, 6 pages.*

(Continued)

*Primary Examiner* — Daniel L Murphy

(57) ABSTRACT

Seismic pulses are emitted are emitted with consecutive time intervals that follow a pattern described by several Golomb rulers, wherein at least two of the Golomb rulers have at least four marks, such that pair-wise time intervals between seismic pulse emissions are different, to distinguish seismic reflections stemming from different seismic pulses and/or seismic sources from each other. This allows executing seismic surveys with several simultaneously operated seismic source arrays, thereby reducing the survey cost. In a marine environment the seismic sources may be air-gun arrays towed by one or more vessels, and the method can be also applied onshore.

18 Claims, 16 Drawing Sheets

(58) Field of Classification Search
USPC .......................................................... 367/23
See application file for complete search history.

(56) References Cited

U.S. PATENT DOCUMENTS

| | | |
|---|---|---|
| 2002/0181328 A1 | 12/2002 | De Kok |
| 2009/0251256 A1 | 10/2009 | Fullerton et al. |
| 2010/0008184 A1* | 1/2010 | Hegna ................ G01V 1/36 367/21 |
| 2011/0018484 A1 | 1/2011 | Fullerton et al. |
| 2012/0014212 A1 | 1/2012 | Eick et al. |
| 2012/0026843 A1 | 2/2012 | Fullerton et al. |
| 2012/0147699 A1 | 6/2012 | Dellinger et al. |
| 2012/0147701 A1 | 6/2012 | Ross et al. |

FOREIGN PATENT DOCUMENTS

| | | |
|---|---|---|
| JP | 2005260743 | 9/2005 |
| JP | 2011182067 | 9/2011 |
| WO | 200171386 | 9/2001 |
| WO | 200291020 | 11/2002 |
| WO | 200596016 | 10/2005 |

OTHER PUBLICATIONS

Schleicher, Jorg et al., "Reduction of crosstalk in blended-shot migration", Thirteenth International Congress of the Brazilian Geophysical Society, Rio de Janeiro, Brazil, Aug. 26-29, 2013, 6 pages.
Strong, Shaun et al: "Numerical modelling of pseudo-random land seismic sources", ASEG Extended Abstracts, vol. 2004, No. 1,Jan. 1, 2004 (Jan. 1, 2004), p. 1, XP055100932.
Drakakis, K., "A review of the available construction methods for Golomb rulers", Advances in Mathematics of Communications, vol. 3, p. 235-250 (2009).
Cunningham, Allen B. "Some Alternate Vibrator Signals", Geophysics, Presented at the 48th Anual International SEG meeting Nov. 1, 1978, San Francisco, 17 pages.
Galinier, P. et al., "A Tabu Search algorithm for difference triangle sets and Golomb rulers" Computers and Operations Research, Oxford, GB, vol. 33 No. 4 Apr. 1, 2006, pp. 955-970 XP024985383.
Fam, Adly T., "Good Code Sets by Spreading Orthogonal Vectors via Golomb Rulers and Costas Arrays" Radar Conference 2010 IEEE, IEEE, Piscataway, NJ, USA, May 10, 2010 pp. 1060-1063 XP031696581.
Cherry, E.C., "Some experiments on the recognition of speech, with one and two ears", published in the Journal of the Acoustic Society. Am. 25, 975-979, 1953.
Klove, T., "Bounds on the size of optimal difference triangle sets", IEEE Transactions on Information Theory, vol. IT-34, p. 355 (1988).
Robinson et al, "A class of binary recurrent codes with limited error propagation", IEEE Transactions on Information Theory, vol. IT-13, p. 106-113 (1989).
Colbourn et al., "Difference triangle sets," in the CRC Handbook of Combinatorial Designs, San Diego, CA: CRC, 1995, ch. IV. 14.
Chu et al, "A note on the equivalence between strict optical orthogonal codes and difference triangle sets", IEEE Transactions on Information Theory, vol. 49, p. 759-761 (2003).
Shearer, J.B., "Difference triangle set constructions", IBM research report RC24623 (W0808-045), IBM Research Division (2008).
Chu et al, "Sequence designs for ultra-wideband inpulse radio with optimal correlation properties", IEEE Transactions on Information Theory, vol. 50, p. 2402-2407 (2004)).
Ling, A. C.,"Difference triangle sets from affine planes", IEEE Transactions on Information Theory, vol. 48, p. 2399-2401(2002).
Chung et al: "Optical orthogonal codes: Design analysis and applications", IEEE Transactions on Information Theory, vol. 35, p. 595-604 (1989)).

\* cited by examiner

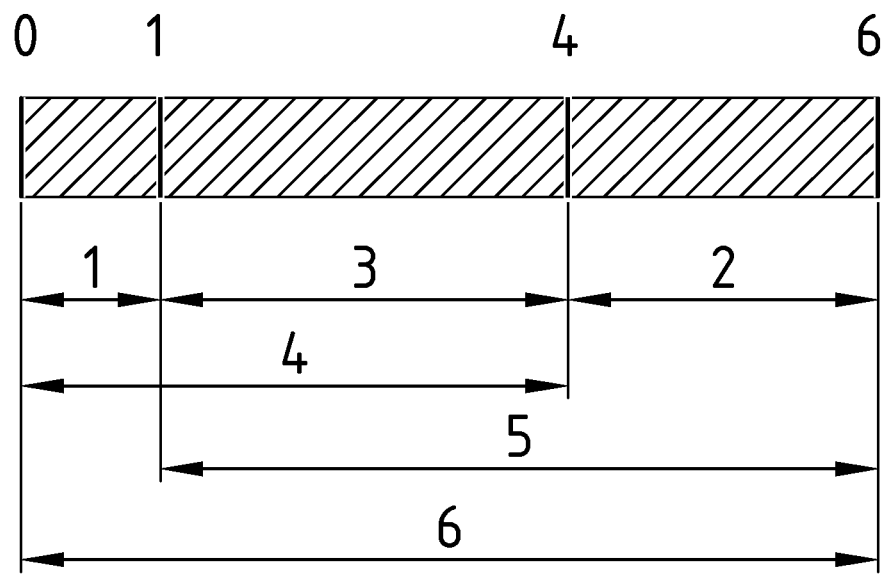
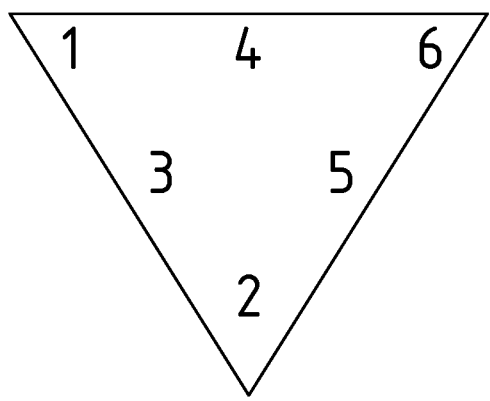
FIG. 1

| Construction | Number of marks | Ruler length |
|---|---|---|
| Cubic ruler (Dimitromanolakis, 2002) | $n$ | $n^3 - 2n^2 + 2n$ |
| Erdös and Turan (1941) | $p$ | $\leq 2p^2 - p - 1$ |
| Welch sequences (Golomb and Taylor, 1982) | $p - 1$ | $2(p-2)(p-1)$ |
| Singer (1938) | $q + 1$ | $q^2 + q + 1$ |
| Bose and Chowla (1962); Bose (1942) | $q$ | $q^2 - 1$ |
| Lindström (1998); Ruzsa (1993) | $p - 1$ | $p^2 - p$ |

FIG. 5

| Mark | 1 | 2 | 3 | 4 | 5 | 6 | 7 | 8 | 9 | 10 | 11 |
|---|---|---|---|---|---|---|---|---|---|---|---|
| Position | 22 | 29 | 30 | 40 | 49 | 85 | 90 | 102 | 133 | 166 | 180 |
| Mark | 12 | 13 | 14 | 15 | 16 | 17 | 18 | 19 | 20 | 21 | 22 |
| Position | 215 | 218 | 231 | 255 | 257 | 285 | 289 | 314 | 428 | 434 | 449 |

| Mark | 1 | 2 | 3 | 4 | 5 | 6 | 7 | 8 | 9 | 10 | 11 |
|---|---|---|---|---|---|---|---|---|---|---|---|
| Ruler 1 | 22 | 30 | 40 | 90 | 102 | 166 | 180 | 218 | 314 | 428 | 434 |
| Ruler 2 | 29 | 49 | 85 | 133 | 215 | 231 | 255 | 257 | 285 | 289 | 449 |

| Mark | 1 | 2 | 3 | 4 | 5 | 6 | 7 | 8 | 9 | 10 | 11 |
|---|---|---|---|---|---|---|---|---|---|---|---|
| Ruler 1 | 11 | 15 | 20 | 45 | 51 | 83 | 90 | 109 | 157 | 214 | 217 |
| Ruler 2 | 14 | 24 | 42 | 66 | 107 | 115 | 127 | 128 | 142 | 144 | 224 |

FIG. 7

| Mark | 1 | 2 | 3 | 4 | 5 | 6 | 7 | 8 | 9 | 10 |
|---|---|---|---|---|---|---|---|---|---|---|
| Ruler 1 | 0 | 19 | 24 | 26 | 32 | 125 | 128 | 181 | 243 | 257 |
| Ruler 2 | 0 | 39 | 91 | 114 | 152 | 198 | 226 | 235 | 247 | 283 |
| Ruler 3 | 0 | 11 | 78 | 105 | 122 | 147 | 176 | 194 | 239 | 273 |
| Ruler 4 | 0 | 33 | 64 | 68 | 119 | 141 | 206 | 207 | 222 | 265 |

FIG. 8

| Mark | 1 | 2 | 3 | 4 | 5 | 6 | 7 | 8 | 9 | 10 |
|---|---|---|---|---|---|---|---|---|---|---|
| Ruler 1 | 0 | 68 | 72 | 138 | 153 | 181 | 271 | 370 | 462 | 463 |
| Ruler 2 | 0 | 37 | 56 | 132 | 157 | 294 | 440 | 472 | 474 | 589 |
| Ruler 3 | 0 | 7 | 211 | 223 | 297 | 421 | 466 | 550 | 573 | 576 |
| Ruler 4 | 0 | 30 | 63 | 94 | 213 | 237 | 259 | 264 | 367 | 509 |
| Ruler 5 | 0 | 75 | 104 | 200 | 206 | 424 | 486 | 535 | 551 | 592 |
| Ruler 6 | 0 | 135 | 190 | 226 | 377 | 387 | 398 | 448 | 456 | 465 |
| Ruler 7 | 0 | 18 | 38 | 185 | 220 | 233 | 356 | 445 | 532 | 672 |
| Ruler 8 | 0 | 52 | 193 | 240 | 293 | 352 | 366 | 449 | 529 | 571 |
| Ruler 9 | 0 | 40 | 145 | 184 | 261 | 305 | 359 | 419 | 553 | 681 |

| Mark | 1 | 2 | 3 | 4 | 5 | 6 | 7 | 8 | 9 | 10 |
|---|---|---|---|---|---|---|---|---|---|---|
| Ruler 1 | 56 | 92 | 224 | 275 | 375 | 509 | 581 | 644 | 755 | 843 |
| Ruler 2 | 1 | 93 | 236 | 280 | 388 | 511 | 588 | 648 | 763 | 846 |
| Ruler 3 | 2 | 98 | 238 | 284 | 391 | 456 | 600 | 661 | 770 | 854 |
| Ruler 4 | 7 | 102 | 183 | 297 | 399 | 457 | 602 | 664 | 782 | 861 |
| Ruler 5 | 11 | 115 | 184 | 300 | 406 | 462 | 547 | 672 | 784 | 873 |
| Ruler 6 | 24 | 118 | 189 | 308 | 418 | 466 | 548 | 679 | 729 | 875 |
| Ruler 7 | 27 | 126 | 193 | 315 | 420 | 479 | 553 | 691 | 730 | 820 |
| Ruler 8 | 35 | 133 | 206 | 327 | 365 | 482 | 557 | 693 | 735 | 821 |
| Ruler 9 | 42 | 145 | 209 | 329 | 366 | 490 | 570 | 638 | 739 | 826 |
| Ruler 10 | 54 | 147 | 217 | 274 | 371 | 497 | 573 | 639 | 752 | 830 |

| Mark | 1 | 2 | 3 | 4 | 5 | 6 | 7 |
|---|---|---|---|---|---|---|---|
| Ruler 1 | 1 | 74 | 145 | 182 | 260 | 321 | 350 |
| Ruler 2 | 1 | 65 | 125 | 207 | 245 | 304 | 373 |
| Ruler 3 | 1 | 88 | 150 | 190 | 236 | 317 | 353 |
| Ruler 4 | 1 | 93 | 146 | 188 | 239 | 293 | 361 |
| Ruler 5 | 1 | 68 | 133 | 203 | 259 | 302 | 378 |
| Ruler 6 | 1 | 76 | 131 | 179 | 264 | 316 | 374 |
| Ruler 7 | 1 | 89 | 122 | 202 | 247 | 296 | 359 |
| Ruler 8 | 8 | 74 | 146 | 190 | 264 | 296 | 373 |

FIG. 9

| design | sources | shots | dB | Period | Length | δt msec |
|---|---|---|---|---|---|---|
| Ruzsa | 2 | 6 | 15 | 0.8 sec | 0.5 sec | 10 |
| Welch | 2 | 6 | 15 | 1.2 sec | 0.8 sec | 70 |
| Singer | 2 | 7 | 17 | - | 0.7 sec | 10 |
| Bose/Chowla | 2 | 8 | 18 | - | 0.9 sec | 10 |
| Ruzsa | 2 | 8 | 18 | 1.4 sec | 1.0 sec | 10 |
| Welch | 2 | 8 | 18 | 2.4 sec | 1.7 sec | 100 |
| Ruzsa | 2 | 9 | 19 | 1.8 sec | 1.3 sec | 10 |
| Welch | 2 | 9 | 19 | 2.9 sec | 2.2 sec | 120 |
| Ruzsa | 2 | 11 | 20 | 2.6 sec | 2.3 sec | 10 |

| design | sources | shots | dB | Period | Length | δt msec |
|---|---|---|---|---|---|---|
| Ruzsa | 3 | 6 | 15 | 1.2 sec | 0.8 sec | 10 |
| Ruzsa | 3 | 10 | 20 | 3.1 sec | 2.5 sec | 10 |
| Ruzsa | 4 | 7 | 17 | 2 sec | 1.5 sec | 10 |
| Ruzsa | 4 | 9 | 19 | 3.4 sec | 2.5 sec | 10 |
| Ruzsa | 4 | 10 | 20 | 4 sec | 3 sec | 10 |
| PG | 5 | 6 | 15 | 1.6 sec | 1.2 sec | 10 |
| Ruzsa | 5 | 6 | 15 | 1.9 sec | 1.3 sec | 10 |
| Ruzsa | 5 | 8 | 18 | 3.3 sec | 2.5 sec | 10 |
| Welch | 6 | 6 | 15 | 1.9 sec | 1.7 sec | 140 |
| Ruzsa | 6 | 6 | 15 | 2.3 sec | 1.5 sec | 10 |
| Ruzsa | 6 | 7 | 17 | 3 sec | 2.3 sec | 10 |
| Ruzsa | 6 | 10 | 20 | 6 sec | 4.7 sec | 10 |
| Ruzsa | 7 | 6 | 15 | 2.6 sec | 2 sec | 10 |
| PG | 7 | 8 | 18 | 4.0 sec | 3 sec | 10 |
| Ruzsa | 7 | 10 | 20 | 7.1 sec | 5.7 sec | 10 |
| Mendelsohn | 8 | 7 | 17 | 5.0 sec | 4.0 sec | 200 |
| PG | 8 | 9 | 19 | 6.0 sec | 5.0 sec | 10 |
| Ruzsa | 8 | 9 | 19 | 6.6 sec | 5.4 sec | 10 |
| Ruzsa | 9 | 8 | 18 | 6 sec | 4.6 sec | 10 |
| PG | 9 | 10 | 20 | 8.2 sec | 7.0 sec | 10 |
| Ruzsa | 10 | 6 | 15 | 3.7 sec | 2.7 sec | 10 |
| Ruzsa | 10 | 7 | 17 | 5 sec | 3.3 sec | 10 |
| Welch | 10 | 10 | 20 | 9.1 sec | 8.6 sec | 360 |
| PG | 11 | 10 | 20 | 14.7 sec | 10 sec | 10 |

FIG. 10

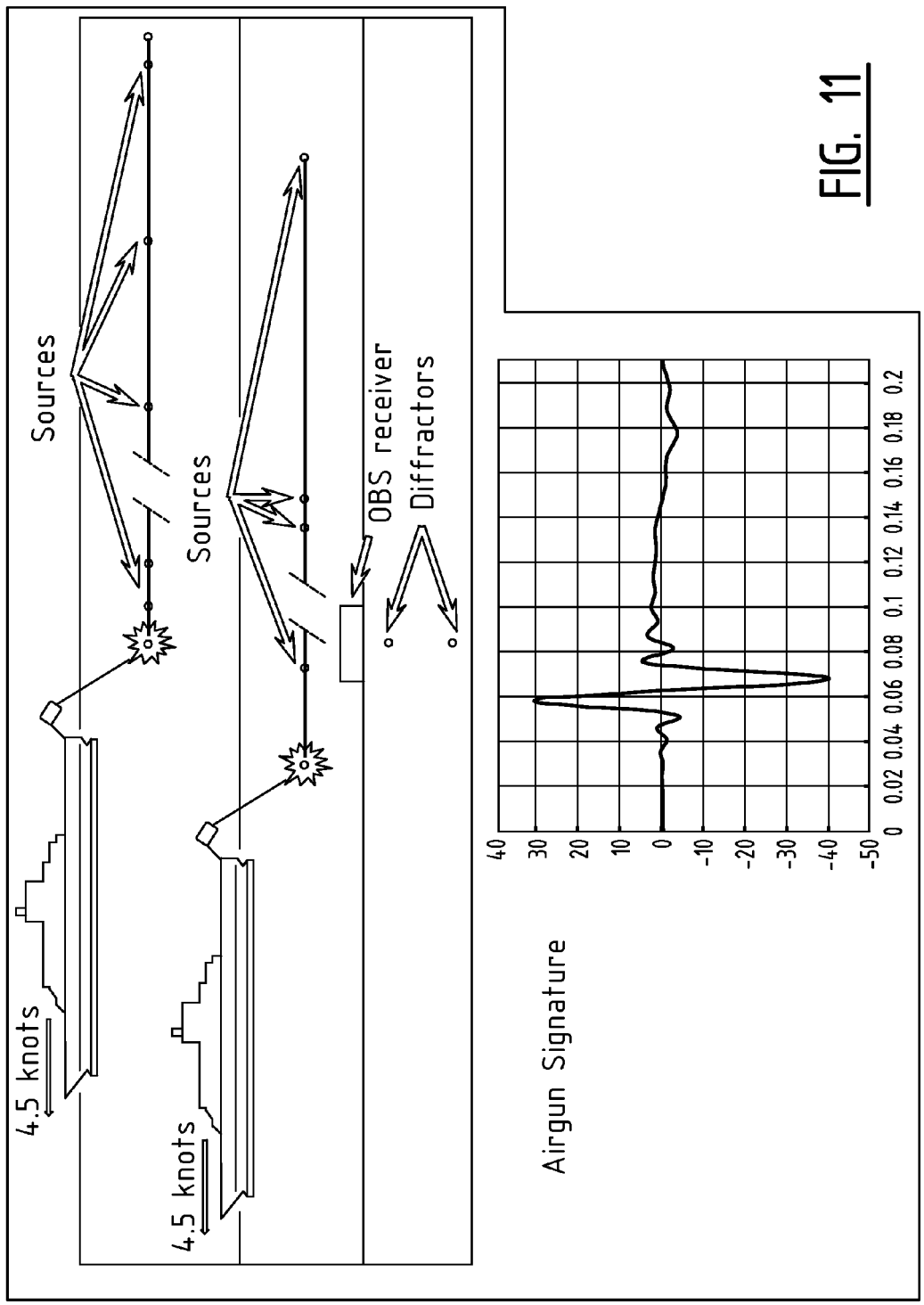

SEISMIC ACQUISITION METHOD AND SYSTEM

BACKGROUND OF THE INVENTION

The invention relates to a seismic acquisition method and system.

In seismic surveys with active sources, a source generates energy that propagates through the earth and is partially reflected back. The reflected energy is measured by receivers. The acquired data is then used to obtain information concerning the structure of the earth's sub-surface. Seismic surveys are very expensive. The surveys cost may be reduced by using several sources concurrently and thus decreasing the survey time. To make it possible, one should be able to recover the signal generated by an individual source from the combined signal generated by all the sources.

It is known from US patent application US2012/0014212 to fire an array of seismic sources in a distinctive loop of composite pulses where the returning wavefield is source separable based on the distinctive composite pulses thereby creating an identifiable loop of identifiable composite pulses so that two or more seismic acquisition systems can acquire seismic data concurrently. In a marine environment the peak energy delivered into the water may be less, which will reduce the irritation of seismic data acquisition to marine life.

A challenge in using seismic sources together resembles the cocktail party problem as formulated by E. C. Cherry in the article "Some experiments on the recognition of speech, with one and two ears", published in the Journal of the Acoustic Society. Am. 25, 975-979, 1953. The cocktail party problem involves cross-talk problems generated by background noise generated by various people in a crowded room who simultaneously talk to each other. A listener who follows one of the speakers needs to separate his/her speech from voices of other speakers. The human brain can separate speeches. However this is a difficult problem for existing signal processing techniques.

Separation of controlled sources can be achieved by "tuning" the sources, so that the signal emitted by each source has distinct individual characteristics compared to signals emitted by other sources. For example, transmitters in radio communication emit signals in non-overlapping frequency ranges, which allows for a radio receiver to separate the signal sent by a selected transmitter and eliminate unwanted signals. This method is not applicable to seismic sources, because each source needs to fire all the frequencies within the seismic range (approximately from 0 to 100 Hz) to provide a good quality response. "Tuning" pulse-type sources which are used in marine acquisition is even more difficult, because their frequency content can hardly be changed.

Pulse-type sources arrays are distinguishable, when they emit pulses according to unique time ruler. The rulers are designed in such a way that they have proper de-ruler properties which makes each source array shot time ruler to become identifiable from the overall data. By using the proper de-ruler operator on the total received signal, the signature of a selected ruler can be recovered from the others.

The idea of using coded sequences of pulses to recover individual signals from simultaneously recorded sources is known in the industry. In particular, shooting schemes have been proposed that employ random firing patterns. The major challenge for application in the seismic domain is to design shooting sequences with good distinguishable properties to maximize the separation of the sources and minimize the emitted seismic energy. Coded sequences of pulses are also used in fiber-optic communication systems, where various sequences with good correlation properties (optical orthogonal codes) have been developed. These sequences however cannot be straightforwardly applied to seismic acquisition because the requirements to the seismic acquisition systems and to the fiber-optic communication systems are essentially different and mostly not based on maximizing the emitted energy but instead on the separation of data only.

It is observed that the mathematician Salomon Golomb devised a Golomb ruler with several marks (M) such that all pair-wise distances between marks are different and that single Golomb rulers have been applied for various technical applications outside the seismic acquisition domain.

Chinese patent application CN102904581 discloses a method to reduce storage complexity of a Low Density Parity Check (LDPC) code check matrix by constructing a check matrix of LDPC codes on the basis of a single Golomb Ruler.

Chinese patent application CN102412848 discloses a Quasi Cyclic-Low Density Parity Check (QC-LDPC) code construction method based on mode Golomb rulers to reduce search complexity.

US patent applications US201020026843 and US20110018484 disclose stepping motors with magnet pole pattern codes that may be based on a Golomb Ruler code.

US patent application US20090251256 discloses a coded linear magnet array which may have a polarity corresponding to a desired spatial force function that may be based on a Golomb Ruler spacing code.

Japanese patent application JP2011182067 discloses a speaker array wherein the speakers may be arranged at intervals that are proportional to a scale resolution of the shortest Golomb rulers.

Japanese patent application JP2005260743 discloses a microphone array wherein the microphones are arranged at distances proportional to a scale distance of a minimum Golomb Ruler.

It is furthermore observed that several non Golomb Ruler algorithms based on work by Salomon Golomb have been applied in the geophysical imaging domain.

International patent application WO2005096016 discloses a data compression method that may comprise a Golomb-Rice code. International patent application WO 02/091020 discloses a linear recursion formula defined by Salomon W. Golomb and International patent application WO01/71386 discloses an electroseismic waveform identified by S. Golomb.

It is furthermore observed that various quasi-random sequences, including a Golomb ruler, have been discussed in relation with shooting patterns of a single source, see Shaun Strong et al: "Numerical modelling of pseudo-random land seismic sources", ASEG EXTENDED ABSTRACTS, vol. 2004, no. 1, 1 Jan. 2004 (2004 Jan. 1), page 1, XP055100932.

U.S. Pat. No. 6,906,981 B2 granted to Vaage Svein Toreif on 14 Jun. 2005 discloses a seismic acquisition method, wherein seismic pulses are emitted with varying time intervals in an unspecified quasi-random manner, see column 6, lines 22 and 23.

The term "a difference triangle set" was introduced by T. Klove: "Bounds on the size of optimal difference triangle sets", IEEE Transactions on Information Theory, vol. IT-34, p. 355 (1988).

Difference triangle sets are used in communication theory, see J. P. Robinson and A. J. Bernstein: "A class of binary recurrent codes with limited error propagation", IEEE Transactions on Information Theory, vol. 1. p. 106-113 (1989), and in combinatorial design, see C. J. Colbourn: "Difference triangle sets," in *The CRC Handbook of Combinatorial Designs*, C. J. Colbourn and J. H. Dinitz, Eds. San Diego, Calif.: CRC, 1995, ch. IV. 14.

Difference triangle sets are equivalent to the so-called strict optical orthogonal codes that were proposed for fiber-optic code-division multiple-access (FO-CDMA) networks, see W. Chu and S. W. Golomb: "A note on the equivalence between strict optical orthogonal codes and difference triangle sets", IEEE Transactions on Information Theory, vol. 49, p. 759-761 (2003).

Difference triangle sets can be constructed by splitting a single Golomb ruler in parts. Known methods to design single Golomb rulers are reviewed by K. Drakakis: "A review of the available construction methods for Golomb rulers", Advances in Mathematics of Communications, vol. 3, p. 235-250 (2009). Methods to construct difference triangle set from Golomb rulers have been described by J. P. Robinson and A. J. Bernstein: "A class of binary recurrent codes with limited error propagation", IEEE Transactions on Information Theory, vol. IT-13, p. 106-113 (1989) and by A. C. Ling: "Difference triangle sets from affine planes", IEEE Transactions on Information Theory, vol. 48, p. 2399-2401 (2002). Other difference triangle set constructions are reviewed by J. B. Shearer: "Difference triangle set constructions", IBM research report RC24623 (W0808-045), IBM Research Division (2008).

These prior art references do not teach or suggest that it is beneficial to emit seismic pulses with varying time intervals based on a plurality of Golomb rulers.

In marine seismic surveys seismic shots are generally emitted by submarine airgun arrays which emit seismic shots with time intervals of about 10 seconds to avoid cross-talk of acoustic reflections from consecutive shots.

Although Golomb rulers and different triangle sets are well known and they have been applied in various areas, specifically in wireless communication, it is not obvious beforehand that designs based on sets of several Golomb rulers can be beneficial in seismic data acquisition. In particular, it is not obvious that there exist such sets of Golomb rulers that meet the practical constraints imposed by actual seismic acquisition systems.

In conventional seismic acquisition, shots are done about every T=10 seconds. The shot duration can be extended in time. By applying the deconvolution procedure one compresses the signal generated by a source to a relatively narrow spike. The minimum spike time-width $\Delta t$ is determined by the frequency contents of the signal. It is approximately equal to $\Delta t = 1/\nu$, where $\nu$ is the frequency of the highest harmonic in the signal temporal Fourier spectrum. In seismic acquisition, one deals with frequencies up to $\nu=100$ Hz. Higher seismic frequencies cannot propagate through earth on sufficiently large distances due to attenuation. Hence, seismic pulses can be deconvolved to spikes with the width of about $\Delta t=10$ milliseconds. It means that sequences of seismic pulses can be designed using only those Golomb rulers whose lengths are not essentially larger than $T/\Delta t=1000$. Here, the length of a Golomb ruler is the number of unit intervals in this ruler.

There is a need for an improved seismic acquisition method and system wherein seismic reflections stemming from different seismic pulses and/or seismic sources can be accurately distinguished from each other.

Furthermore there is a need for an improved seismic acquisition method and system that provide shooting sequences with good distinguishable properties to maximize the separation of the sources and minimize the emitted seismic energy.

SUMMARY OF THE INVENTION

In accordance with the invention there is provided a seismic acquisition method, wherein seismic pulses are emitted so that consecutive time intervals between pulses follow a pattern of a set of several Golomb rulers, wherein at least two of the Golomb rulers have at least four marks.

It is observed that Golomb rulers with less than four marks provide a level of separation of sources below 12 dB, and they present only a limited interest for seismic acquisition. For seismic acquisition tt is generally preferably to have Golomb rulers with larger number of marks, because they provide a larger source separation. However, the Golomb ruler length and hence the time required to emit a sequence of pulses increases with the increasing number of marks, and it can be unacceptably large for practical purposes. The embodiment of 4 Golomb rulers with 10 marks described in more detail below provides a reasonable compromise between a relatively high source separation level of 20 dB and a relatively short shooting sequence of less than 10 second.

Positions of Golomb ruler marks and the Golomb ruler length may be described in dimensionless units, which represent time intervals. The time interval corresponding to 1 unit can be chosen arbitrarily. This interval however, should not be smaller than a characteristic time-width of a deconvolved seismic pulse, which is typically of about 10 msec.

Numbers representing pair-wise distances or time intervals between the Golomb ruler marks may be written in a triangular format, which is called a difference triangle. Any numbers in a difference triangle appear at most once in the subject difference triangle.

In the method according to the invention a difference triangle set construction known from the communication theory may be used to acquire seismic data and to design sequences of pulses with optimal correlation properties. These sequences minimize the side-lobes in the record from a single source, and minimize the interaction between different sources. They also reduce the maximal seismic power emitted by the sources, thus reducing the environmental impact of seismic surveys.

Accordingly, the at least one set of Golomb rulers may form a difference triangle set with the property that all pair-wise distances between two marks of any ruler of this set are unique.

The difference triangle set construction may control the emission of seismic pulses such that pair-wise time intervals between seismic pulse emissions are different, to distinguish seismic reflections stemming from different seismic pulses and/or seismic sources from each other.

Each Golomb ruler in a difference triangle set may have at least 10 marks and a length of at most 1000 units and each seismic pulse may have a signal to noise ratio of at least 20 dB and the length of each of the time intervals may be less than 10 seconds.

The seismic acquisition may be applied in a marine environment and the seismic source comprises of a submarine airgun assembly.

In such case the submarine airgun assembly may comprise a plurality of air-gun arrays that each shoots seismic pulses on a different difference triangle set pattern, wherein:
(a) the air-guns arrays are located at a distance of least 1 meter from each other; and
(b) each air-gun array comprises a plurality of airguns that are spaced at a distance of at most 15 meters from each other.

In accordance with the invention there is furthermore provided a seismic acquisition system, the system comprising at least one seismic source which is configured to emit seismic pulses with consecutive time intervals that follow a pattern described by several Golomb rulers, wherein at least two of the Golomb rulers have at least four marks difference triangle set construction.

These and other features, embodiments and advantages of the seismic acquisition method and system according to the invention are described in the accompanying claims, abstract and the following detailed description of non-limiting embodiments depicted in the accompanying drawings, in which description reference numerals are used which refer to corresponding reference numerals that are depicted in the drawings.

Similar reference numerals in different figures denote the same or similar objects.

Different features and embodiments of the method and system according to the invention as depicted and/or described in the accompanying claims, abstract and the following detailed description may be combined in different ways.

BRIEF DESCRIPTION OF THE DRAWINGS

FIG. 1 shows an example of a Golomb ruler and a corresponding difference triangle;

FIG. 5 shows properties of several single Golomb rulers constructed using different algorithms;

FIG. 7 shows a circular Ruzsa & Lindstrom ruler with 22 marks and a difference triangle set consisting of two Golomb rulers with 11 marks, which is obtained by splitting the Ruzsa & Lindstrom ruler in two parts;

FIG. 8 shows a difference triangle set consisting of four circular Golomb rulers with 11 marks obtained by splitting a Ruzsa & Lindstrom ruler with 22 marks in four parts;

FIG. 9 shows difference triangle sets constructed by using (from top to bottom) finite projective geometries, the Welch design and a perfect Mendelsohn design;

FIG. 10 shows some properties of series of seismic pulses that are shot according to various difference triangle set constructions;

FIG. 11 shows a setup used in a numerical modelling of a marine seismic surveying assembly with two ships with airgun arrays that emit sequences of pulses according to the difference triangle set shown in FIG. 7;

DETAILED DESCRIPTION OF THE DEPICTED EMBODIMENTS

FIG. 1 shows a Golomb ruler of length L=6 units with four marks (M=4) at positions 0, 1, 4, and 6. Numbers representing pair-wise distances between the marks are written in a triangular format, which is called a difference triangle. Any numbers in the difference triangle appears at most once. The ruler in FIG. 1, as well as other examples that follow, is used to explain the features and concepts of the invention, and it does not limit the scope of the claims to the examples shown.

The Golomb ruler shown in FIG. 1 is used to design a series of seismic pulses as follows.

Figure 2:
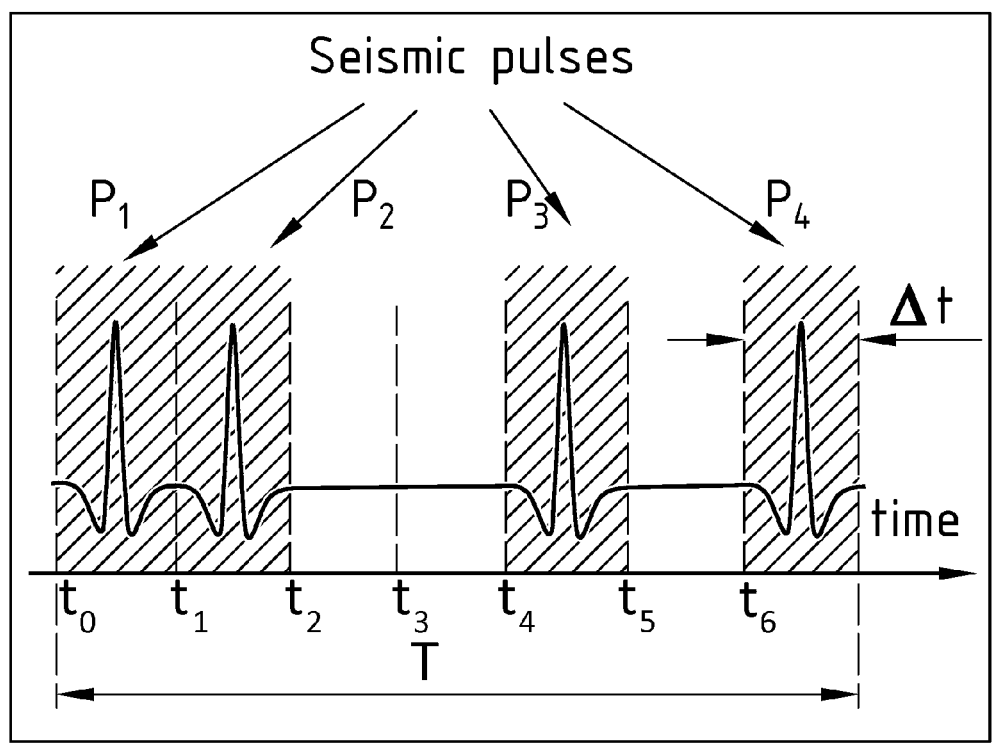
FIG. 2 shows deconvolved seismic pulses reflected by a subsurface formation.

The time interval T during which the sequence is fired is split in N=L+1=7 equal sub-intervals. The sub-intervals are labelled consecutively from 0 to 6. The time corresponding to the beginning of an interval with the label j is denoted by $t_j$, as FIG. 2 shows. The time width of every interval is equal to $\Delta t=T/7$. Four seismic pulses are fired at those sub-intervals whose labels correspond to marks of the Golomb ruler, i.e. at the sub-intervals with labels 0, 1, 4, and 6. The exact firing time can be chosen arbitrarily within a given sub-interval. It is important however, that each of the pulses has the same time off-set with respect to the beginning of the sub-interval where this pulse is fired, i.e. the pulse $p_j$ is fired at the time $t_j+\delta t$, where $\delta t$ is constant. In the same way one designs a sequence of pulses using any other Golomb ruler.

A deconvolution procedure is conventionally applied to seismic data. This procedure results in a pulse compression. The duration of actual pulses sent in the subsurface can exceed several seconds. By deconvolving these pulses one reduces them to relatively narrow spikes with the width of about 100 milliseconds. Shown in FIG. 2 are not the actual pulses, but deconvolved (or partially deconvolved) pulses. While the duration of actual pulses might be arbitrary, we assume that the characteristic width of the deconvolved pulses is less than or is comparable to the time-width $\Delta t$ of sub-intervals shown in FIG. 2.

Figure 3:
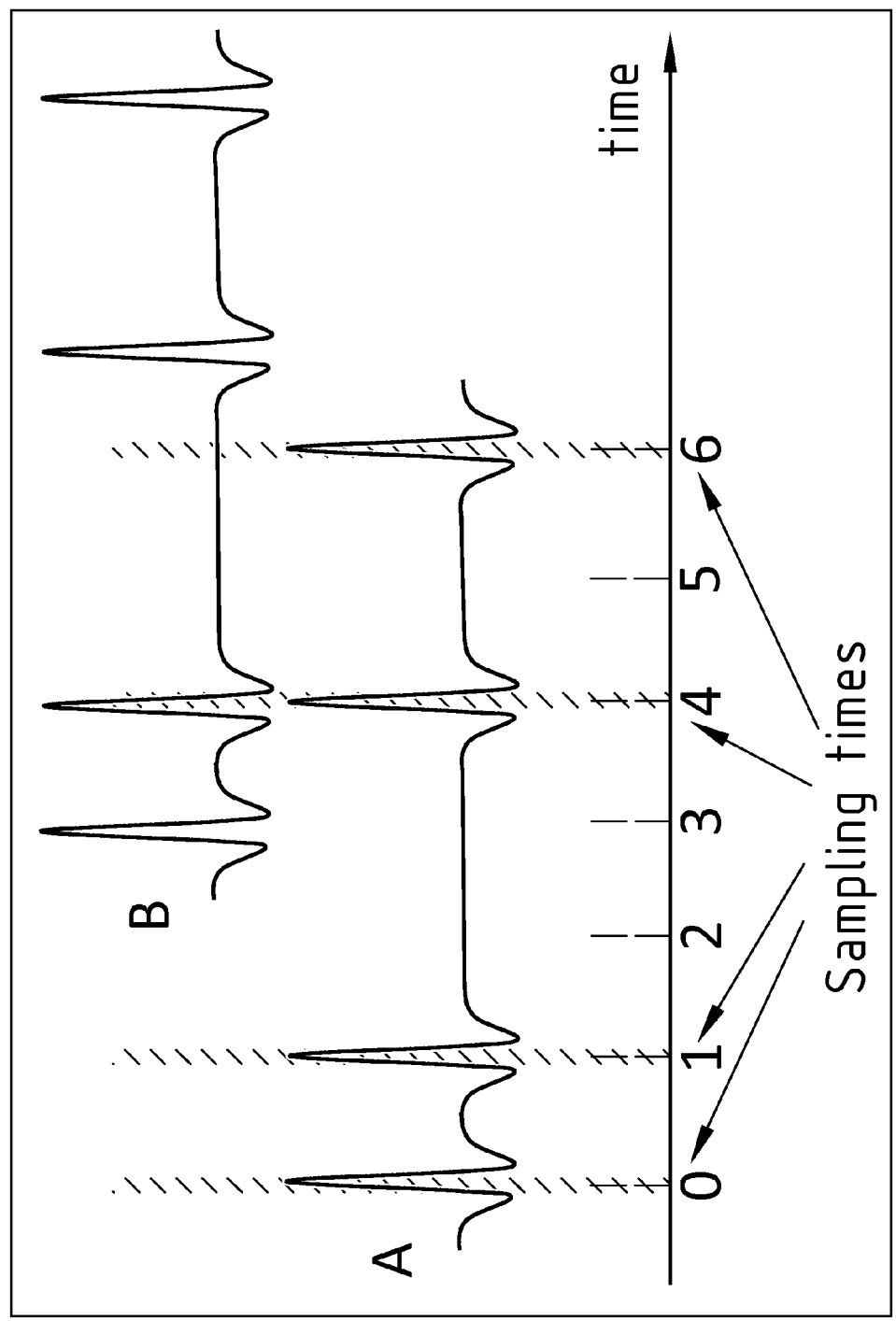
FIG. 3 shows two deconvolved seismic pulses that are converted to relatively narrow spikes.

If seismic pulses are sent in the subsurface according to FIG. 2, the signals generated by reflection from and/or scattering by underground targets will have the same time relation. FIG. 3 shows two such signals A and B. Similarly to FIG. 2, we assume that the measured signals have been (partially) deconvolved so that the original pulses are converted to relatively narrow spikes.

If signals A and B partially overlap in time, as FIG. 3 shows, a receiver will record the sum these signals. We denote the total receiver record by R(t). For any given time t we calculate the sum $R(t)+R(t+\Delta t)+R(t+4\Delta t)+R(t+6\Delta t)$ $=\Sigma R(t+m_j \Delta t)$. Here, $m_j=(0, 1, 4, 6)$ are marks of the Golomb ruler from FIG. 1 and $\Delta t$ is the time-width of sub-intervals in FIG. 2. Suppose that time t coincides with the arrival of the first spike in the signal A. Since the sequence of sampling times $t+m_j\Delta t$ is the same as the sequence of pulses' firing, the times $t+\Delta t$, $t+4\Delta t$, and $t+6\Delta t$ will coincide with the arrival of the second, third and fourth pulses in the signal A. As the result, all four pulses from the signal A will show up in the above sum. The contribution of the signal A to the sum will be equal to the single pulse amplitude multiplied by four.

We assume that the signal B does not coincide with the signal A, so that the first pulses in the signals A and B arrive at the receiver at different times. Then at most one of the pulses from the signal B can contribute to the above sum $\Sigma R(t+m_j\Delta t)$. In the example shown in FIG. 3 this is the second pulse whose arrival coincides with the third sampling interval t+4Δt. Appearance of two or more pulses from the signal B within sampling intervals is impossible due to properties of the Golomb ruler. Indeed, suppose that the pulse $p_a$ appears in the sampling interval t+$m_j$ Δt and the $p_b$ appears in the sampling interval t+$m_k$ Δt. Since the pair-wise distance between marks of Golomb rulers are unique, this is only possible if a=j and b=k. However, in this case the pulses in the signal will be synchronized with the sampling intervals and hence the signal B will coincide with the signal A, which contradicts to our assumption.

The example considered shows that by firing seismic pulses corresponding to marks of a Golomb ruler and then summing the received data within sampling intervals arranged according to the same relation, one compresses the received signal into a spike. If the signal arrived is in phase with the sampling intervals, like signal A in FIG. 3, a spike in the record will appear. The amplitude of this spike (the peak) is M times larger than the amplitude of the single pulse. Here, M is the number of pulses, which is the same as the number of marks in the Golomb ruler. If the signal arrived is out of phase with respect to the sampling intervals, like signal B in FIG. 3, then its contribution to the record (a side-lobe) will not be larger than the amplitude of the signal pulse. In other words, Golomb ruler patterns play a role of the magnifying glass that amplifies M times the signal we are looking for.

The peak to side-lobe amplitude ratio of 20 log(M) dB provided by Golomb rulers is the highest possible that can be achieved compared to any other sequence of pulses. Since positions of reflectors in the sub-surface and hence the arrival times can be arbitrary, at least one of the pulses may appear within one of the sampling windows. In contrast to other sequences, e.g. random sequences and m-sequences, the Golomb ruler construction guarantees that no more than one pulse appears within sampling windows in case of out-of-phase signals.

Figure 4:
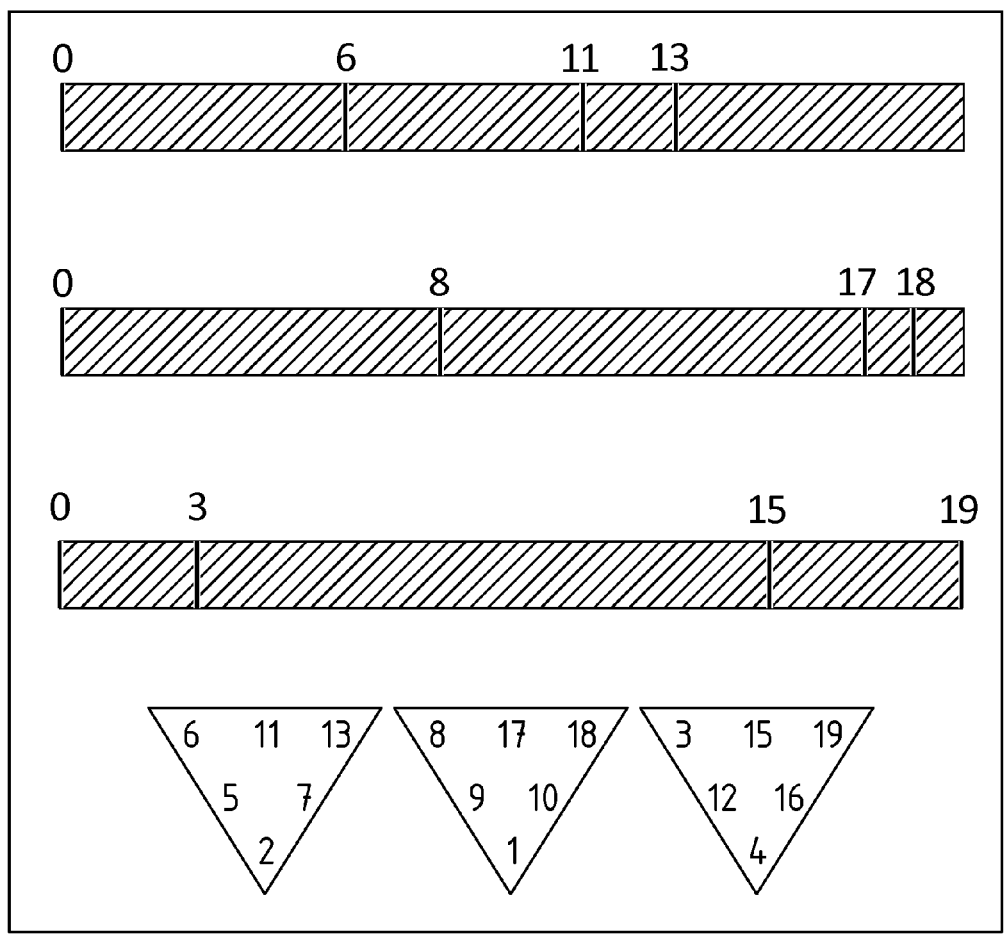
FIG. 4 shows an example of a difference triangles set consisting of three Golomb rules with 4 marks and the corresponding difference triangle set.

The above design relates to a single source. To apply the described method to multiple sources one needs to construct a set of several Golomb rulers, such as the distances between any two marks of any of the rulers are unique. Such sets are called the difference triangle sets. FIG. 4 shows an example (due to Rankin, 1993) of a difference triangle set consisting of three Golomb rulers each having M=4 marks and satisfying such a property. This can be checked directly by calculating pair-wise distances between the marks of the rulers, writing the numbers representing these distances in a triangular form, similarly to what has been done in FIG. 1, and observing that all the numbers in three triangles are different. Each of the three rulers is used to design a sequence of pulses, similarly to what is shown in FIG. 2, and three sequences of sampling times, similarly to what is shown in FIG. 3. Each of the designed pulse rulers is fired by one of the three sources while its sampling times are used to process the data. As has been explained above, the pulse train with the same pattern as the sampling time produces spikes in the record with the peak to side-lobe amplitude ratio of 20 log(M)=12 dB. The two other pulse trains can never be in phase with the sampling time ruler, and since all the pair-wise distances between the marks of the three Golomb rulers are different, at most one of the pulses trains can appear within the sampling time intervals. Thus, similarly to the case of a single source, the signal we are looking for is magnified M times, while the remaining signals are either absent in the record or appear there without a magnification.

Although Golomb rulers and different triangle sets are well known and they have been applied in various areas, specifically in wireless communication, it is not obvious beforehand that designs based on sets of several Golomb rulers can be beneficial in seismic data acquisition. In particular, it is not obvious that there exist such sets of Golomb rulers that meet the practical constraints imposed by actual seismic acquisition systems.

In conventional seismic acquisition, shots are done about every T=10 seconds. The shot duration can be extended in time. By applying the deconvolution procedure one compresses the signal generated by a source to a relatively narrow spike. The minimum spike time-width Δt is determined by the frequency contents of the signal. It is approximately equal to Δt=1/ν, where ν is the frequency of the highest harmonic in the signal temporal Fourier spectrum. In seismic acquisition, one deals with frequencies up to ν=100 Hz. Higher seismic frequencies cannot propagate through earth on sufficiently large distances due to attenuation. Hence, seismic pulses can be deconvolved to spikes with the width of about Δt=10 milliseconds. It means that sequences of seismic pulses can be designed using only those Golomb rulers whose lengths are not essentially larger than T/Δt=1000. Here, the length of a Golomb ruler is the number of unit intervals in this ruler. For example, the length of the ruler shown in FIG. 1 is equal to 6, and the length of the rulers shown in FIG. 4 is equal to 19.

A Golomb rulers with M marks can be used to design pulse trains that after processing as is described above recovers the signal with 20 log(M) dB peak to side-lobe amplitude ratio. A difference triangle set consisting of Golomb rulers with M marks, similar to the set shown in FIG. 4, gives in addition the source separation at the level of 20 log(M) dB. In above examples we considered rulers with M=4 marks, which give the separation of about 20 log(4)=12 dB. This separation level might be not sufficient for practical purposes. For beneficial applications of difference triangle set designs it is desirable to reach the separation level of about 15 to 20 dB. For this purpose it is preferred to use Golomb rulers with 6 to 10 marks. Using a single source that fires seismic pulses distributed in time according to marks of Golomb rulers is already beneficial, because the peak seismic power and hence the environmental impact are reduced. To reduce the cost of seismic surveys one would like to use several sources simultaneously.

The seismic acquisition method according to the invention may be used to acquire seismic data with a single pulse-type source, or with several pulse-type sources that shoot or are recorded concurrently, where at least two sequences of pulses distributed following two different Golomb rulers are emitted by one or more seismic sources. The invention may employ a difference triangle set construction known from the communication theory to acquire seismic data and to design sequences of pulses with optimal correlation properties. These sequences minimize the side-lobes in the record from a single source, and minimize the interaction between different sources. They also reduce the maximal seismic power emitted by the sources, thus reducing the environmental impact of seismic surveys. The disclosure also describes requirements to the source control system and teaches how to design a marine seismic survey. The relative peak to side-lobe amplitude ratio and the source separation may be about 20 dB for typical marine survey parameters.

The method according to the invention may be applied in an onshore or marine environment. In a marine environment a marine seismic survey may be performed using a plurality of seismic sources that are operated in a parallel mode, and wherein seismic pulses are fired in time rulers arranged according to marks of Golomb rulers in a difference triangle set and satisfy the above requirements. Namely, at least 4 Golomb rulers with 10 marks and of length less than 1000 can be found and used for a marine seismic survey design, so that the peak to side-lobe amplitude ratio and the source separation level of about 20 dB can be achieved taking into account practical constraints imposed by actual seismic acquisition systems.

Generally speaking, one needs extensive numerical simulations to find difference triangle sets consisting of several Golomb rulers with a large number of marks.

However, difference triangle sets can be obtained by splitting a single Golomb ruler in several parts, and there exist analytical algorithms, which make constructions of certain single Golomb rulers relatively easy.

FIG. 5 presents some of these algorithms.

The algorithms by Singer, Bose & Chowla, and Ruzsa & Lindstrom result in so-called circular Golomb rulers.

Figure 6:
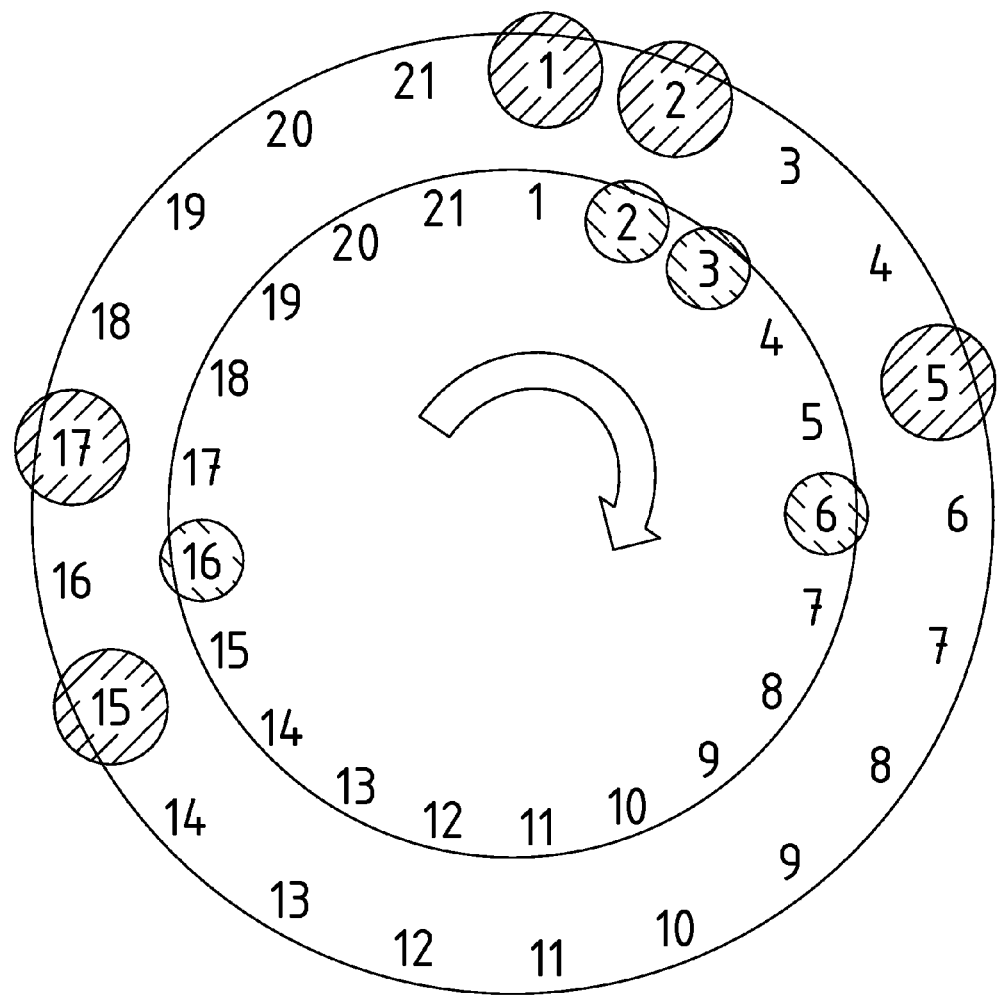
FIG. 6 shows a circular Golomb ruler.

FIG. 6 shows a Singer's construction of a circular Golomb ruler of length 21 with marks 1, 2, 5, 16, and 18.

Each pair of marks determines two distances: in the clock-wise and counter clock-wise directions.

For example the distance from mark 1 to mark 5 is equal to 4 in the clock-wise direction and is equal to 17 in the counter clock-wise direction. All these pair-wise distances are unique. Applying the same arguments as in comments to FIG. 3, one concludes that a cyclical shift of marks of a circular Golomb ruler gives a set of marks that does not have more than one common mark with the original set. For example by shifting-marks 1, 2, 5, 16, and 18 clock-wise by a unit distance one gets the set of marks 2, 3, 6, 17, and 19. Two sets of marks have a single overlap at mark 2.

One can use circular Golomb rulers to construct linear rulers. For example marks 1, 2, 5, 16, and 18 of a circular Golomb ruler with length 21 (see FIG. 6) can be considered as marks of a linear ruler of length 18−1=17. The resulting linear ruler will be shorter if one considers the mark 15 as the first mark and re-labels the other marks in the clock-wise direction respectively. This gives a linear ruler with marks 1, 3, 8, 9, and 12 of length 11. Some optimal, i.e. shortest possible linear Golomb rulers were designed in such a way.

In the following example it is explained how to construct a difference triangle set starting from a single Golomb ruler. The Ruzsa & Lindstrom ruler is used for this purpose.

To construct a Ruzsa & Lindstrom ruler one selects a prime number p and a number g such as powers $g^n$ of g with n=1, 2, ... p−1 give after division by p distinct remainders ranging from 1 to p−1. Then one selects a number r, $0<r\leq p-1$ that is relatively prime to p−1 and composes the sequence $s_n = r(p-1) g^n + p n$. Remainders of division of $s_n$ by p (p−1) are (p−1) marks of a circular Golomb ruler of length p(p−1). Upper FIG. 7 shows 22 marks of a Ruzsa & Lindstrom ruler with parameters p=23, g=5, and r=1. The length of this ruler is equal to L=506.

M marks of a circular Golomb ruler form M(M−1) distances. Since these distances are all distinct, the ruler length L cannot be less than M (M−1). The minimum possible length $L_{min}$ of a circular ruler with p−1 marks is $L_{min} \geq (p-1)(p-2)$. The ratio of lengths of a Ruzsa & Lindstrom ruler $L_R$ to the minimum possible ruler is equal to $L_R/L_{min} \leq p/(p-2)$. If p>>1 then $L_R$ and $L_{min}$ are approximately the same. This shows that the Ruzsa & Lindstrom construction gives asymptotically optimal circular Golomb rulers. In particular, the length of a circular ruler with 22 marks cannot be shorter than the Ruzsa & Lindstrom ruler shown in FIG. 7 by more than about 10%.

To construct a difference triangle set consisting of two Golomb rulers one splits marks of the upper ruler in FIG. 7 in two groups. The first group consists of 11 marks with even numbers and the second group consists of 11 marks with odd numbers. These groups are shown in the middle part of FIG. 7. Using these two groups of marks one makes two circular Golomb rulers of length 506. By construction, the distances between any two marks of any of these two rulers are unique. Hence, as has been explained in comments to FIG. 4, one can arrange patterns of pulses of two sources according to marks of these rulers to achieve the peak to the side-lobe amplitude ratio and the source separation the level of 20 log(11)=21 dB.

The two above Golomb rulers can be shortened two times. Since the marks of the first ruler are even, one can divide their labels by 2. This gives a circular Golomb ruler of length 253. Shifting the marks of the second ruler by an odd number, e.g. by 1, one obtains another Golomb ruler with even marks. Dividing the marks' labels by 2, one also reduces it to a ruler of length 253. Lower FIG. 7 shows the two resulting circular Golomb rulers of length 253. As has been explained above, one unit of a ruler that is used for designing trains of seismic pulses can be as small as about 10 msec. It means that the sequences of the seismic pulses that are designed using rulers in FIG. 7 can be fired within the time of about 253*10 msec=2.53 sec, which satisfies our requirements.

The same method can be applied to construct larger difference triangle sets. FIG. 8 shows a difference triangle set consisting of 4 circular Golomb rulers. This set has been obtained by splitting a Ruzsa & Lindstrom ruler with 40 marks in 4 parts. The length of each of these 4 circular rulers is equal to 410. However, they can be converted to linear rulers, so that the length of the largest ruler is equal to 283. In practical terms it means that one can construct pulse sequences for 4 simultaneous sources with the peak to the side-lobe amplitude ratio and the source separation the level of 20 log(10)=20 dB and with duration of 283*10 msec=2.83 sec. If necessary, one can rescale the rulers and increase the time intervals between seismic pulses proportionally.

Difference triangle sets can be obtained by splitting other single Golomb rulers, e.g. Bose-Chowla or Singer rulers. It should be emphasized that one can also use other methods to construct difference triangle sets. In particular, difference triangle sets can be constructed using finite projective geometries (see e.g. F. R. K Chung et al: "Optical orthogonal codes: Design analysis and applications, IEEE Transactions on Information Theory, vol. 35, p. 595-604 (1989)), the Welch design and a perfect Mendelsohn design (see W. Chu and C. J. Colbourn: "Sequence designs for ultra-wideband inpulse radio with optimal correlation properties", IEEE Transactions on Information Theory, vol. 50, p. 2402-2407 (2004)). FIG. 9 shows examples of difference triangle sets obtained using finite projective geometries, the Welch design, and a perfect Mendelsohn design.

Alternatively, difference triangle sets can be found by a numerical search.

It should be also emphasized that there exist difference triangle sets that can be used for designing patterns of pulses for seismic acquisition. This can be seen from FIG. 10 that shows properties of several such patterns. It indicates the design used (notation "PG" stands for finite projective geometry), the shooting patterns, the number of sources, the number of shots, the level of source separation in dB (which is equal to the peak to sidelobe amplitude ratio for a single source), the maximum sequence length, and the minimum time interval between two consecutive shots. If the sequence is circular, so that it can be shooting periodically, the sequence period is also shown.

Depending on the requirements of a specific survey, one or another difference triangle sets can be used. In case of a survey with 2 to 4 boats the shortest sequences are achieved by splitting Ruzsa rulers in 2 to 4 sub-rulers. For a larger number of boats the shortest rulers are constructed using finite projective geometry. The largest minimal separation between consecutive shots is achieved in using the Welch and Mendelsohn designs.

Figure 12:
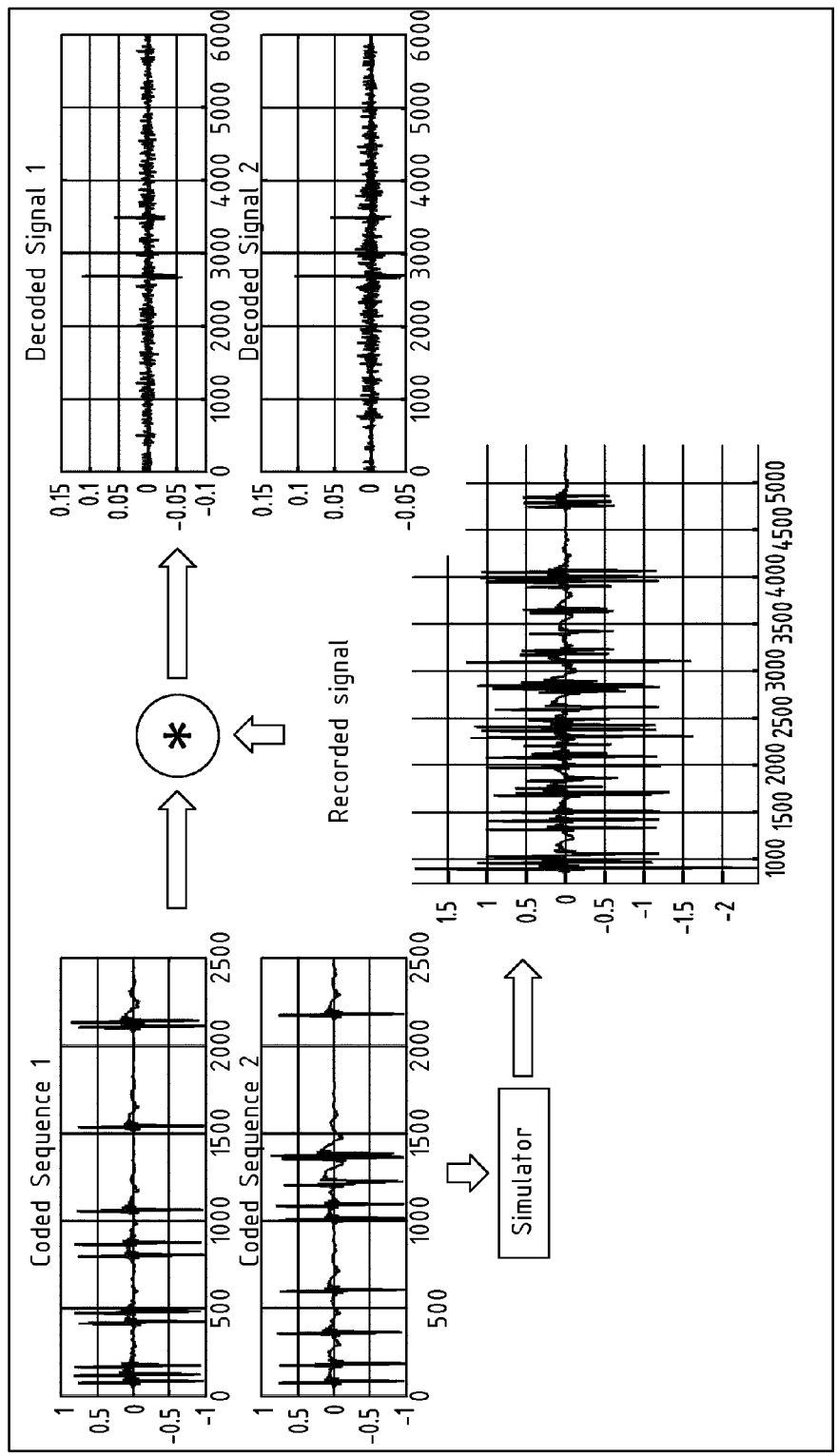
FIG. 12 shows recorded and deconvolved signals generated by the seismic acquisition assembly shown in FIG. 11.

The circumstance that certain shooting patterns based on difference triangle sets satisfy practical requirements for marine seismic acquisition is confirmed by numerical modelling. FIG. 11 shows the setup of such a modelling. We consider two sources, i.e. two ships with air-gun arrays that send sequences of pulses shown in FIG. 7. Two patterns of 11 pulses are sent within 2.5 seconds. We take a realistic pulse signature that is also shown in FIG. 11. The resulting signals sent by both ships are shown in FIG. 12. The seismic pulses are reflected by two underground targets. FIG. 12 shows the total recorded signals and the deconvolved signals. After the deconvolution as described above, the responses generated by the two sources are separated. In both records one sees reflections from two targets. The side-lobe amplitude ratio and the level of source separation were found to be about 19 dB in this example.

Figure 13:
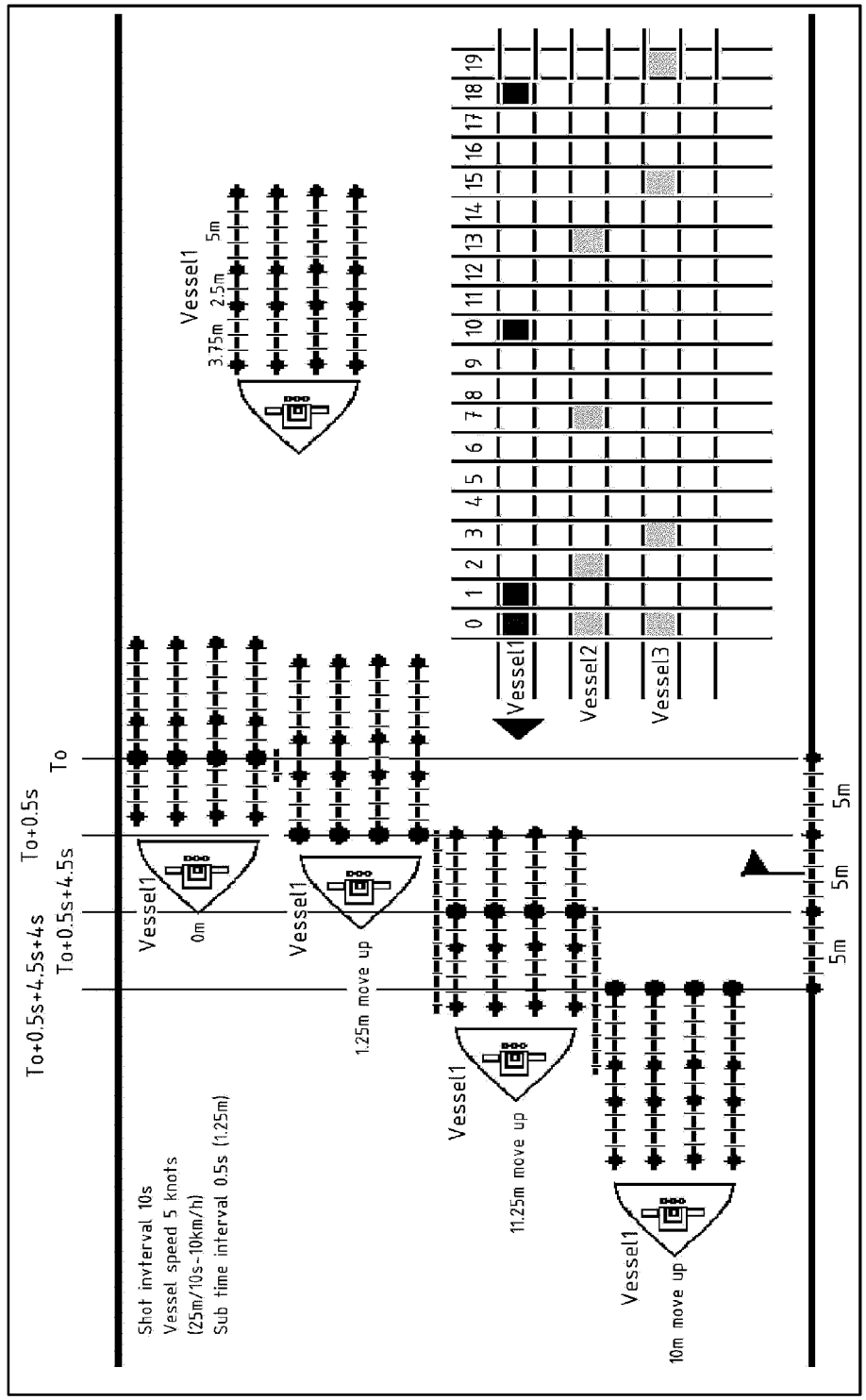
FIG. 13 shows a tow vessel towing an airgun array operated in accordance with the present invention.
Figure 14:
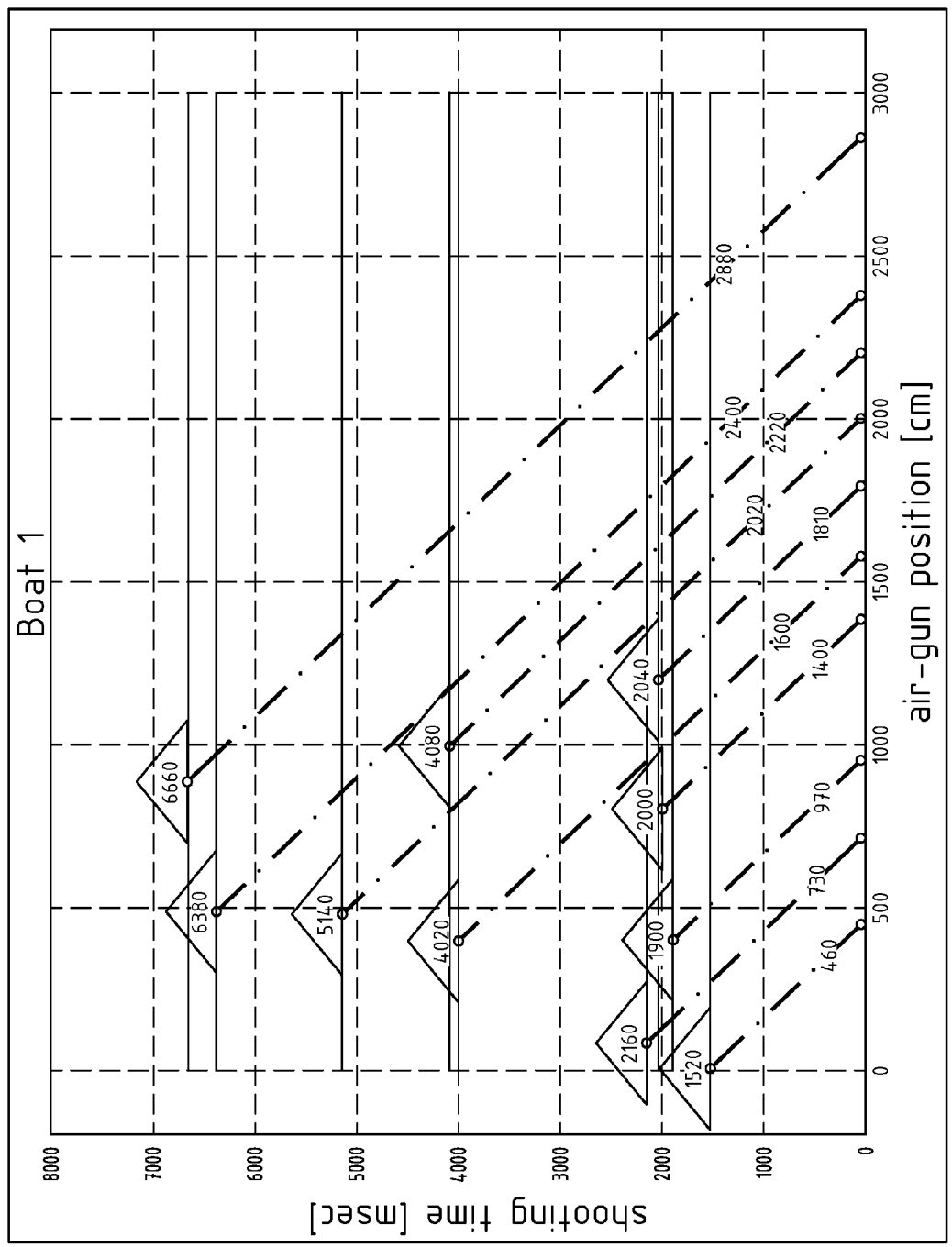
FIGS. 14-17 show arrangements of air-gun clusters in a set up with four seismic sources.
Figure 15:
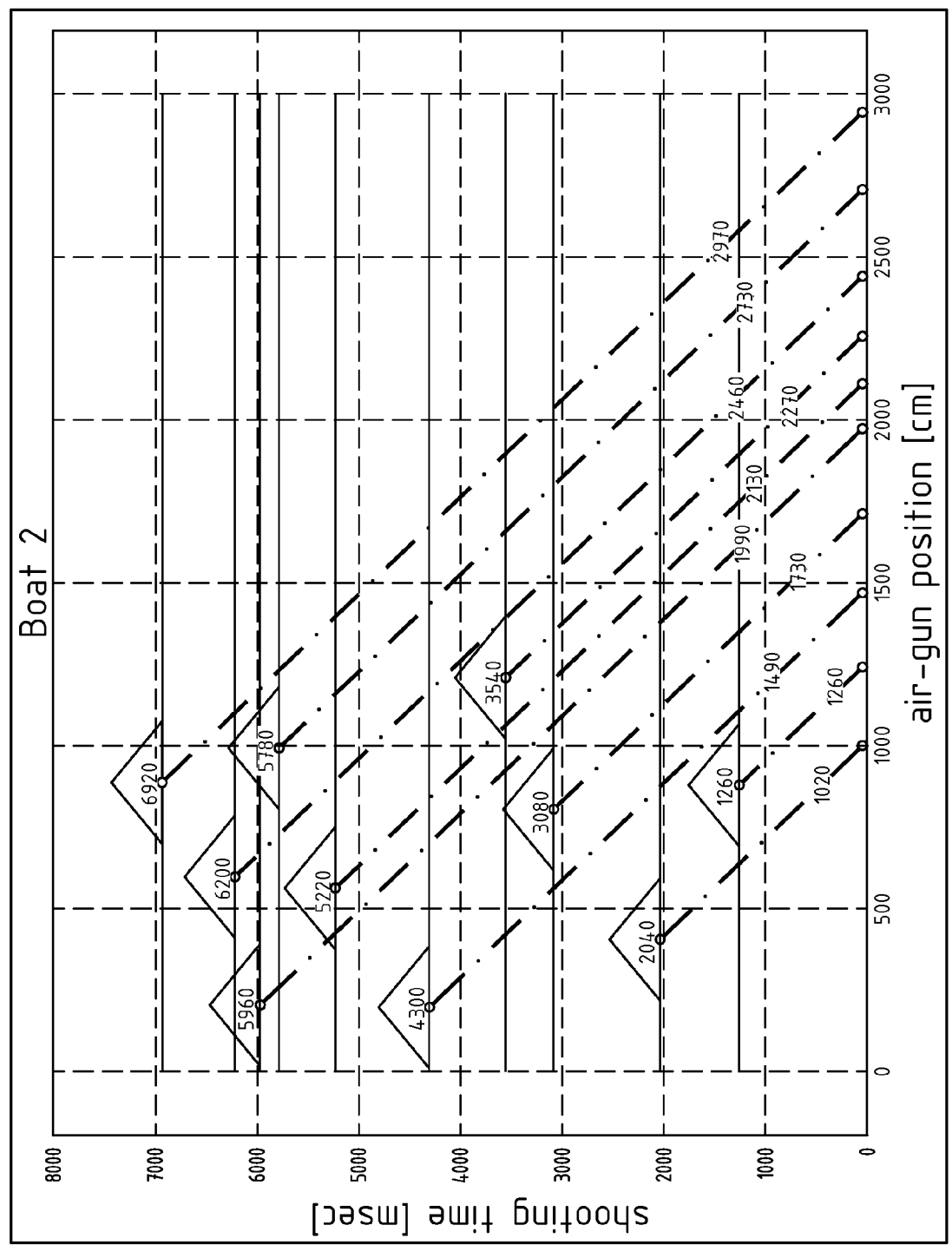
Figure 16:
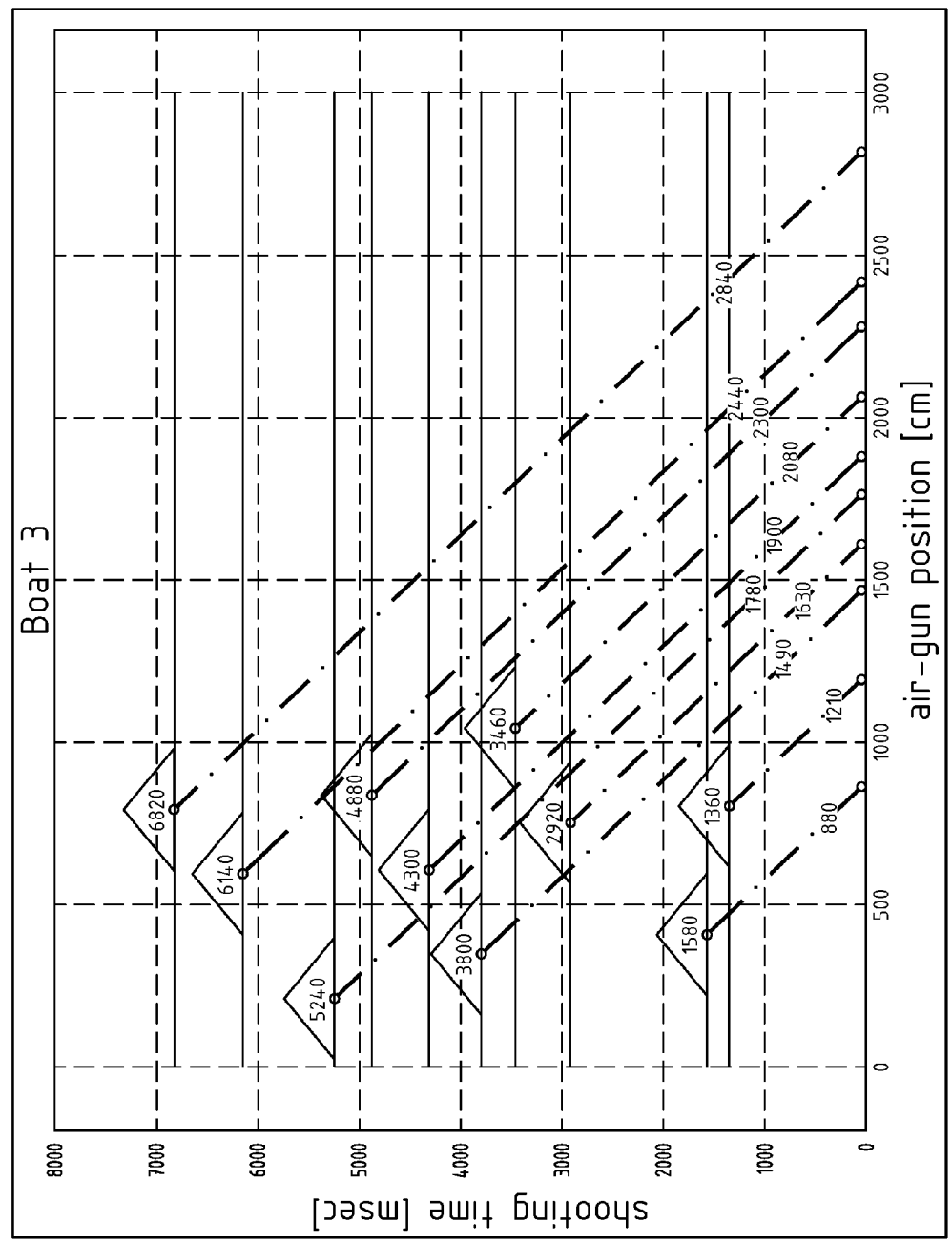
Figure 17:
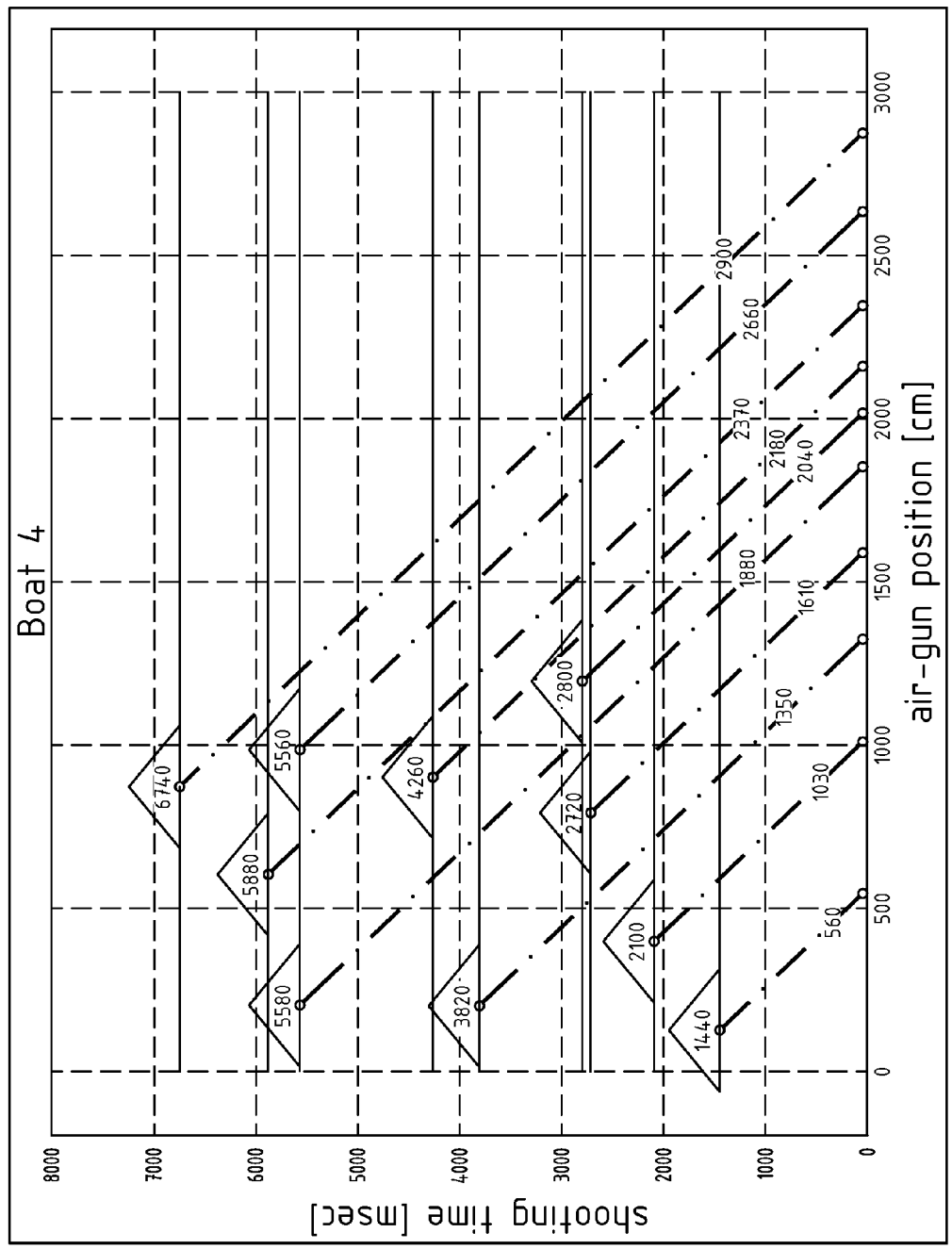

FIG. 13 shows schematically an inventive seismic acquisition system. To simplify drawings, we consider sequences from FIG. 4 that are suitable to design a survey with three simultaneous sources, where each source fires a specific pattern of 4 pulses. FIG. 13 shows one of such sources, which is a tow vessel towing an air-gun array. The air-guns are split in 4 clusters. The air-guns in one cluster fire concurrently. The firing times are different for each cluster and they are distributed according to patterns shown in FIG. 4. The air-gun clusters are placed at different distances between each other. The distances are chosen in such a way that all pulses are fired in the vicinity one point and there is no interaction between bubbles generated by consecutive shots.

It is observed that real air-gun clusters can be arranged in such a way that all pulses are shot within a relatively small area and the bubbles from different shots do not overlap.

FIGS. 14-17 show such an arrangement for the case of air-gun clusters in a set-up with 4 sources. The pulse trains are taken from FIG. 8. We rescale these sequences so that one unit in FIG. 8 corresponds to the time interval of 20 msec and the sequences are fired within time windows of about 5 seconds. Dotted lines in FIGS. 14-17 show trajectories of air-gun clusters. The numbers on the dotted lines show in-line coordinates of air-gun clusters with respect to some reference point. The distances between air-guns are larger than 1 meter, so that they can be placed at the same depth. The shots are fired within the area with the extension of about 15 meters in the inline direction. Triangles show areas, where the interactions of bubbles produced by air-guns can be essential. The air-gun positions are arranged in such a way that these triangles do not overlap, which means that the interaction between the bubbles can be neglected. The numbers inside the triangles represent the cluster firing times. In a similar way one can arrange air-gun clusters for different sets-up.

In the above arrangement positions of seismic sources are chosen to minimize the area where the shots are fired. One can also arrange air-guns so that they fire equidistantly in the in-line direction. This strategy can be preferable in case where the sources are fired according to a difference triangle set pattern consisting of circular Golomb rulers. For example, in case of 10 shots one can fire seismic pulses cyclically every 3 meters. As a result, the area where the shots from one ruler are fired increases up to 30 meters, which might decreases the spatial resolution and might decrease the quality of the deconvolved signal. On the other hand, since the shots are fired cyclically, one can consider any shot position as the starting point of the sequence. Thus, although the measured responses are averaged over 30 meters, one can do such averaging every 3 meters and then stack the measured data. This might improve the quality of the deconvolved signals. Depending on the concrete conditions of the seismic survey one or another approach to arrange shots in space can be favourable.

The peak to the side-lobe amplitude ratio and the source separation level can be improved by optimizing the deconvolution procedure. Consider as an example a circular Golomb ruler with 2 marks, which is represented by the sequence (0, 1, 1, 0, 0, 0). The cyclic autocorrelation of this sequence is equal to (2, 1, 0, 0, 0, 1). Hence, by sending seismic pulses according to this sequence and deconvolving the received signal by correlating it with the original sequence, one gets the peak to the side-lobe amplitude ratio of 2. One can also correlate the received signal with the (−1/3, 1, 1, −1/3, −1/3, −1/3), which is obtained from the original sequence by replacing there zeros by −1/3. The cross-correlation of these two sequences is equal to (2, 2/3, −2/3, −2/3, −2/3, 2/3), which corresponds to the peak to the side-lobe amplitude ratio of 3. This examples shows that the peak to the side-lobe amplitude ratio and the source separation level can be larger than 20 log (M), where M is the number of pulses, can be achieved.

If the firing comprises a large number of shots, say 10 shots or more, then the number of air-guns in one cluster that are shooting together cannot be larger than 4. The pulses produced by different cluster should have similar shape for the method to be applicable. This seemingly contradicts the requirement of having a relatively large number of air-guns (20 or more) to generate a seismic pulse with a sharp peak of energy, where secondary air-bubbles tend to cancel each other. This contradiction still can be resolved by a proper choice of air-guns in the array. Air-guns of different sizes are available in the industry. One can compose an air-gun array in such a way, that the common shot of all the guns produces a pulse with relatively small secondary air-bubbles, while this array can be split in clusters producing a similar seismic pulse signature, so that the separation properties of the difference triangle set are not destroyed.

There exist situations, where a set of Golomb rulers that is used to design sequences of pulses does not need to form a difference triangle set. This happens for example, when two sources are separated by a large distance, so that the cross-talk between them is relatively small. In this case one source can shoot sequences of pulses following a Golomb ruler with M marks and another source following the reversed Golomb ruler. The marks of the reversed ruler go in the reversed order compared to the original ruler. Since a Golomb ruler and its reverse overlap at most at two marks, this construction provides the source separation level of 20 log(M/2) dB, which is added to the source separation level provided by the distance between the sources. The peak to sidelobe ratio for each of the source is equal to 20 log(M).

Similarly, one can use a difference triangle set consisting of Golomb rulers and a difference triangle set consisting of reversed Golomb rulers, which allows using a larger number of simultaneous sources.

The invention claimed is:

1. A marine seismic acquisition method using a plurality of seismic sources each comprising a plurality of clusters of air-guns, wherein seismic pulses are emitted with consecutive time intervals that follow a pattern described by several Golomb rulers, the method comprising:

emitting, by each of the seismic sources, a sequence of seismic pulses following a different Golomb ruler, air-guns in the same cluster fire concurrently, and firing times of air-guns in different clusters in each of the plurality of seismic sources are different and distributed according to marks of the corresponding Golomb ruler.

2. The method of claim 1, wherein Golomb rulers followed by the plurality of seismic sources form a difference triangle set.

3. The method of claim 1, wherein Golomb rulers followed by the plurality of seismic sources form a difference triangle set and its reverse.

4. The method of claim 1, wherein at least one Golomb ruler is cyclic.

5. The method of claim 1, wherein Golomb rulers followed by the plurality of seismic sources have a length of less than 1000 units.

6. The method of claim 1, wherein at least one sequence of seismic pulses has a signal to noise ratio of more than 12 dB.

7. The method of claim 1, wherein the duration of at least one of the sequence of seismic pulses is less than 10 seconds.

8. The method of claim 1, wherein the seismic acquisition is applied in a marine environment and the seismic source comprises of a submarine airgun assembly.

9. The method of claim 1, wherein the air-guns arrays in the assembly are located at a distance of not less than 1 meter from each other.

10. The method of claim 1, wherein in each of the plurality of seismic sources, the clusters are spaced at different distances between each other.

11. The method of claim 1, wherein the method uses four seismic sources each having ten clusters of air-guns, each of the four seismic sources emitting a sequence of seismic pulses following a different Golomb ruler with ten marks.

12. A seismic acquisition system, the system comprising a plurality of seismic sources configured to emit seismic pulses with consecutive time intervals that follow a pattern described by several Golomb rulers, each of the plurality of seismic sources having a plurality of clusters of air guns and being configured to emit a sequence of seismic pulses following a different Golomb ruler, wherein in each of the seismic sources, air guns in the same cluster fire concurrently, and firing times of the air guns in different clusters are different and distributed according to marks of the corresponding Golomb ruler.

13. The system of claim 12, wherein Golomb rulers followed by the plurality of seismic sources form a difference triangle set.

14. The system of claim 12, wherein Golomb rulers followed by the plurality of seismic sources form a difference triangle set and its reverse.

15. The system of claim 12, wherein in each of the plurality of seismic sources, the clusters are spaced at different distances between each other.

16. The system of claim 12, comprising four seismic sources each having ten clusters of air-guns, each of the four seismic sources emitting a sequence of seismic pulses following a different Golomb ruler with ten marks.

17. The system of claim 12, wherein Golomb rulers followed by the plurality of seismic sources each having a length of less than 1000 units.

18. The system of claim 12, wherein the duration of at least one of the sequence of seismic pulses is less than 10 seconds.

* * * * *